Nov. 26, 1957 — G. T. RIEKE — 2,814,418
CLOSURE ADAPTOR FOR CONTAINERS
Filed Feb. 16, 1954
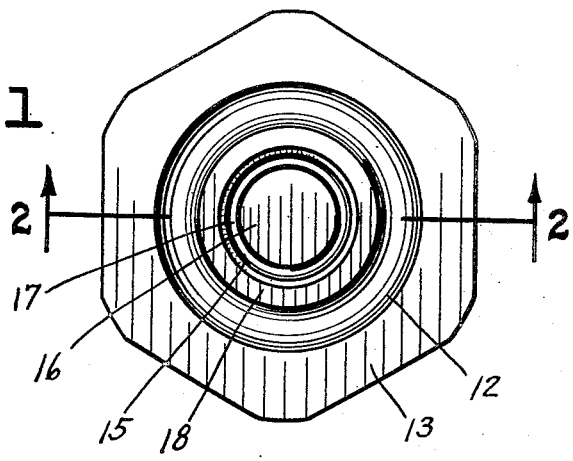
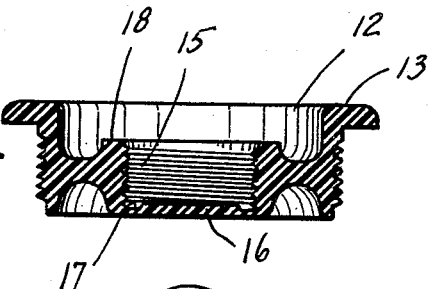
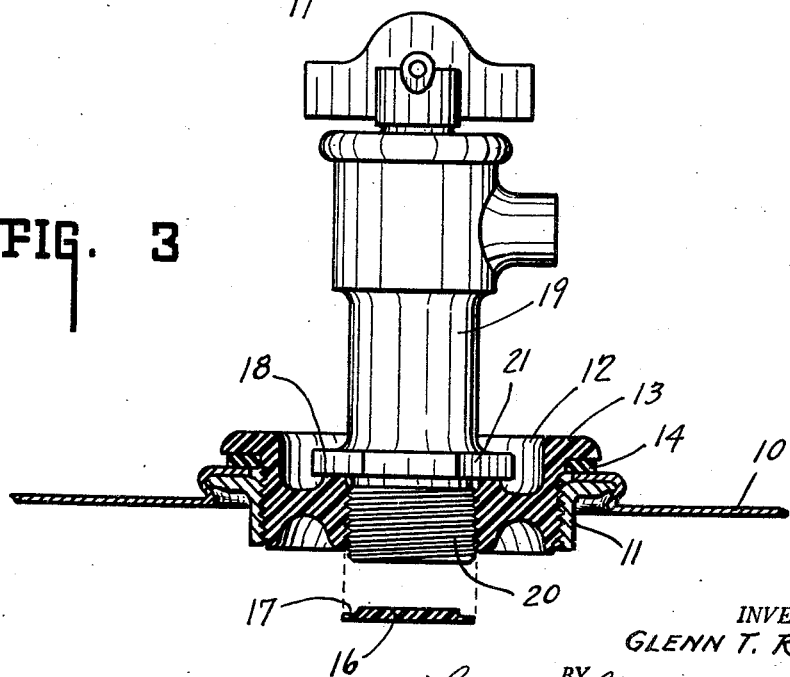
INVENTOR.
GLENN T. RIEKE.

United States Patent Office 2,814,418
Patented Nov. 26, 1957

2,814,418

CLOSURE ADAPTOR FOR CONTAINERS

Glenn T. Rieke, Auburn, Ind., assignor to Rieke Metal Products Corporation, Auburn, Ind., a corporation Application February 16, 1954, Serial No. 410,685

1 Claim. (Cl. 222—91)

This invention relates to a closure adaptor for containers, and particularly metal drums or barrels for storing and dispensing liquids.

It is the purpose of this invention to provide an adaptor for the usual internally threaded flange opening which will hermetically seal the contents, but permit of convenient application of a dispensing unit, such as a valve controlled faucet or pump, without the necessity of utilizing an extra plug with its accompanying gasket. Thus, by means of this invention the usual plug and gasket in what is known as a combination plug is eliminated.

In the usual combination plug the container is generally formed with an internally threaded flange generally adapted to receive the standard 2 inch plug for shipment. However, in adapting a faucet or pump thereto it is necessary to either replace the 2 inch plug with a combination plug or employ the combination plug in the initial sealing, including what is known as the 3/4 inch plug. In the use of the so-called combination plug it then becomes necessary to remove the 3/4 inch plug in order to mount the faucet or pump in its place. This invention, therefore, contemplates doing away with the required 3/4 inch plug of the usual combination type, saving the cost thereof, together with its sealing gasket, as well as the time and labor in removal thereof.

As hereinafter shown and described, an adaptor plug of a compressible material such as flexible plastic is provided. Said plug, which is of the 2 inch type is threaded home in the flange of the container, said adaptor plug having its central portion internally threaded to receive the threads of a faucet or pump, and being provided with an annular sealing shoulder serving as a sealing gasket therefor. At the bottom of the centrally threaded opening a plastic sealing membrane is formed integral with the adaptor plug which is weakened about its scored periphery so that it may be readily severed from the adaptor when it is desired to dispense the contents. During shipment and storage and prior to dispensing the contents said membrane provides a hermetic seal therefor. Additionally, such sealing membrane may serve as a tamper-proof seal indicating that the contents of the container has not been disturbed, wherein the seal has not been severed.

The full nature of the invention will be understood from the accompanying drawings and the following description and claim:

Fig. 1 is a plan view of the adaptor plug shown in Fig. 2.

Fig. 2 is a central vertical section through the adaptor plug with the sealing membrane in sealing position.

Fig. 3 is a central section through the plug and its associated flange secured to the wall of the container and with a dispensing faucet mounted therein with the sealing membrane severed.

In the drawings there is shown the usual container 10 which may comprise a drum or barrel. Crimped within an opening provided therein there is an internally threaded metal flange 11. Threaded into the flange 11 there is an adaptor plug 12 having a substantially axially disposed body portion provided at its outer periphery with a sealing flange 13. Upon the plug being screwed home within the flange 11, the sealing flange 13 engages and seals against a gasket 14.

The adaptor plug is quite similar to, and of a size to serve as a closure in place of the usual 2 inch combination plug, and may be of metal but is preferably of polyethylene (natural). It is provided centrally with what may be termed a 3/4 inch internally threaded recessed portion indicated at 15, which recessed portion is sealed on its underside by an integrally formed sealing membrane 16, said membrane 16 having a scored periphery indicated at 17 for convenient severing thereof to provide an opening in the plug when the contents of the container is to be dispensed. Surrounding the centrally threaded recessed portion, the plug is provided with an upstanding sealing shoulder 18. Thus, with the adaptor plug in place the contents of the container is hermetically sealed by the integral diaphragm 16, rendering it unnecessary to employ a removable 3/4 inch internal or secondary plug.

The usual dispensing faucet or pump 19 is provided with an externally threaded neck portion indicated at 20 over which there extends a base flange 21. The threaded neck portion 20 is arranged to be screwed into the internally threaded central portion of the plug with its base flange 21 screwed home in sealing engagement with the sealing shoulder 18. Prior to screwing the faucet or pump in place the diaphragm 16 may be severed by a knife or suitable tool, or in the case of metal, knocked out. However, it may be removed from the plug by merely screwing the faucet or pump thereagainst until it is severed and forced out of sealing position by the lower edge of the base portion 20 to thereby provide a dispensing opening in the plug.

The invention claimed is:

In combination with an adaptor for a dispenser unit having an externally threaded neck provided with an outwardly extending base flange located inwardly from the outer end of said neck to engage in a container having an opening therein; an internally threaded sleeve to engage in said opening, an outwardly directed flange on the outer end of said sleeve to engage the edges of said opening, an externally threaded plug formed of compressible material to engage the threads of said sleeve and of greater length than the latter, an outwardly extending flange on the outer end of said plug to overlie said sleeve flange, an internally threaded recessed portion centrally disposed within said plug and integral therewith, the inner end of said recessed portion terminating in substantially the same plane with the inner end of said sleeve and the outer end thereof terminating a substantial distance inwardly from the outer end of said plug to provide a sealing shoulder, the distance between said sealing shoulder and the inner end of said recessed portion being less than the distance between said inner neck end and said outwardly directed base flange, and the inner end of said plug being closed by a diaphragm integral with said plug and having a weakened line connecting the diaphragm with said plug.

References Cited in the file of this patent

UNITED STATES PATENTS 74,850     Rigg _____ Feb. 25, 1868

(Other references on following page)

UNITED STATES PATENTS

| | | |
|---|---|---|
| 274,361 | Newcomb | Mar. 20, 1883 |
| 1,701,691 | Mueller et al. | Feb. 12, 1929 |
| 1,838,285 | Rieke | Dec. 29, 1931 |
| 1,887,448 | Behringer | Nov. 8, 1932 |
| 1,933,117 | Markle | Oct. 31, 1933 |
| 1,966,384 | Gabel et al. | July 10, 1934 |

FOREIGN PATENTS

| | | |
|---|---|---|
| 330,123 | Italy | Oct. 4, 1935 |
| 517,498 | Belgium | Feb. 28, 1953 |